(12) United States Patent
Cole et al.

(10) Patent No.: US 7,841,008 B1
(45) Date of Patent: Nov. 23, 2010

(54) THREAT PERSONALIZATION

(75) Inventors: David Michael Cole, Santa Monica, CA (US); Vincent P. Hwang, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 1152 days.

(21) Appl. No.: 11/394,738

(22) Filed: Mar. 31, 2006

(51) Int. Cl.
*G06F 12/14* (2006.01)
(52) U.S. Cl. .......................... 726/25; 713/154; 709/226
(58) Field of Classification Search ........................ None
See application file for complete search history.

(56) References Cited

U.S. PATENT DOCUMENTS

2004/0177263 A1* 9/2004 Sobel et al. ................. 713/200
2004/0193918 A1* 9/2004 Green et al. ................ 713/201

OTHER PUBLICATIONS

Sobel et al., U.S. Appl. No. 11/112,192, filed Apr. 22, 2005, entitled "Dynamic security policy through use of empirical security events".
McCorkendale et al., U.S. Appl. No. 11/020,514, filed Dec. 21, 2004, entitled "Presentation of network source and executable characteristics".
"The "magic eye" watching over your network", pp. 1-2 [online]. Retrieved on Feb. 24, 2006. Retrieved from the Internet: <URL:http://www.sourcefire.com/products/rna.html>, Author unknown.
"Symantec Deepsight™ Alert Services", pp. 1-2. Jun. 2004, Author unknown.
"*Enhanced Dynamic Threat Protection™ via Automated Correlation and Analysis*", Internet Security Systems™ white paper, pp. 1-14, 2002, Author unknown.
"*Symantec™ Deepsight™ Threat Management System*", pp. 1-2. 2003, Author unknown.
"Symantec DeepSight™ Alert Services", pp. 1-2. Jun. 2004, Author unknown.

* cited by examiner

*Primary Examiner*—Taghi T Arani
*Assistant Examiner*—Gregory Lane
(74) *Attorney, Agent, or Firm*—Gunnison, McKay & Hodgson, L.L.P.; Forrest Gunnison

(57) ABSTRACT

A determination is made as to whether there is a correlation between a user's security risk profile and a personalized threat profile of an actual or spreading threat. If there is a correlation, a personalized reactive alert is issued in the case of an actual threat. The personalized reactive alert informs the user of specific suspected data that may have been compromised by the threat and the specific non-computer related action that the user should take. Further, if there is a correlation, a personalized proactive alert is issued and/or personalized proactive protective action taken in the case of a spreading threat. The personalized proactive alert informs the user of the spreading threat that the user and/or the user's host computer system is particularly susceptible to. Further, the personalized proactive protective action taken provides automated risk mitigation.

12 Claims, 4 Drawing Sheets

THREAT PERSONALIZATION

BACKGROUND

1. Field of the Invention

The present invention relates to computer system security. More particularly, the present invention relates to a system and method of proactive and reactive alerting of malicious code on a computer system.

2. Description of the Related Art

There has been a marked shift in the overall threat landscape to highly targeted, silent attacks from the previous generation of noisy, "pandemic" threats. The primary motivation behind the new breed of attacker is financial gain whereas the traditional malware author was motivated by a form of reckless curiosity, ego, and/or a desire for attention.

More particularly, traditional threats were noisy, visible to everyone, indiscriminate, and highly disruptive. As the threats were indiscriminate, general alerts to the public of the looming threats were highly effective at minimizing the impact of the threats.

However, as the new breed of threats is motivated by financial gain, the new breed of threats is highly targeted and silent attacks. Because the threats are highly targeted, general alerts to the public are ineffective. Specifically, as the threats are directed to a small segment of the population, general alerts to the overall population are inapplicable to most of the population. Further, as the population is inundated by general alerts that are by and large inapplicable to any one particular user, the general alerts are ignored.

SUMMARY OF THE INVENTION

In accordance with one embodiment of the present invention, a user's security risk profile is created and personalized threat profiles are created. A determination is made as to whether there is a correlation between the user's security risk profile and a personalized threat profile of an actual or spreading threat.

If there is a correlation between the user's security risk profile and a personalized threat profile of an actual threat, a personalized reactive alert is issued. Illustratively, the personalized reactive alert informs the user of specific suspected data that may have been compromised by the threat, and the specific non-computer related, e.g., business oriented, action that the user should take in light of the detection of the actual threat on the host computer system. For example, the personalized reactive alert informs the user that the user's online bank account and password information may have been compromised by the threat, and that the user should contact the bank to determine whether any fraudulent transactions have occurred, to change the user's account and/or password information, and to alert the bank to monitor the user's account for any suspicious activity.

Further, if there is a correlation between the user's security risk profile and a personalized threat profile of a spreading threat, a personalized proactive alert is issued and/or personalized proactive protective action is taken. Illustratively, the personalized proactive alert informs the user of the spreading threat that the user and/or the user's host computer system is particularly susceptible to and provides risk mitigation guidance. Further, the personalized proactive protective action taken provides automated risk mitigation.

In this manner, a user is put on advanced notice of threats that are significant to the user allowing the user to increase the user's vigilance to protect the user from the threats. Also, a user is not awash in a flood of meaningless alerts and so the user is more likely to respond to the personalized proactive alert. Further, automated risk mitigation techniques are performed to further protect the user from the threats.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
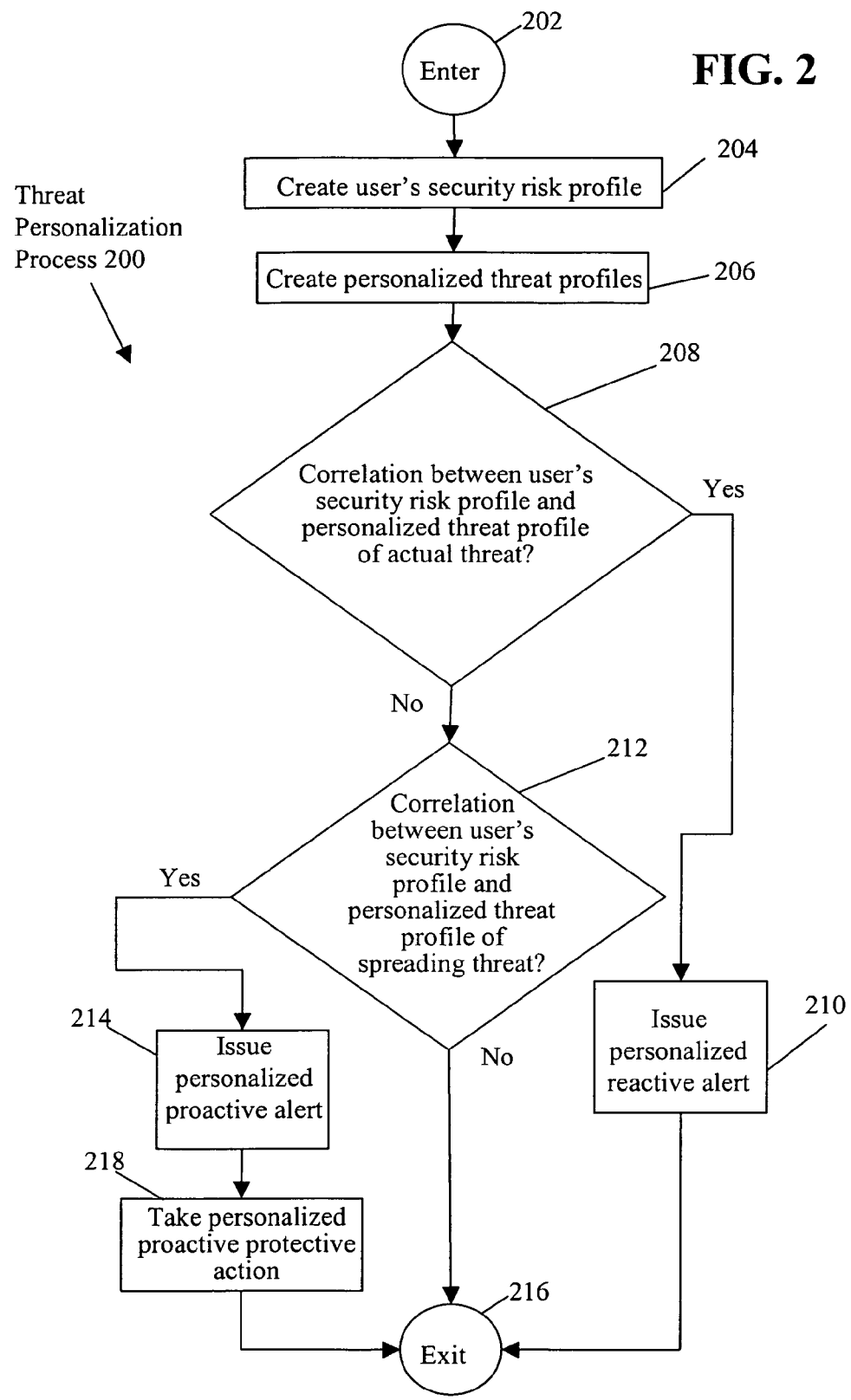
FIG. 2 is a flow diagram of a threat personalization process for issuing personalized proactive and reactive alerts in accordance with one embodiment of the present invention.

In accordance with one embodiment, referring to FIG. 2, a user's security risk profile is created (OPERATION 204) and personalized threat profiles are created (OPERATION 206). A determination is made as to whether there is a correlation between the user's security risk profile and a personalized threat profile of an actual or spreading threat (CHECK OPERATIONS 208, 212, respectively).

If there is a correlation between the user's security risk profile and a personalized threat profile of an actual threat, a personalized reactive alert is issued (OPERATION 210). Illustratively, the personalized reactive alert informs the user of specific suspected data that may have been compromised by the threat, and the specific non-computer related, e.g., business oriented, action that the user should take in light of the detection of the actual threat on the host computer system. For example, the personalized reactive alert informs the user that the user's online bank account and password information may have been compromised by the threat, and that the user should contact the bank to determine whether any fraudulent transactions have occurred, to change the user's account and password information, and to alert the bank to monitor the user's account for any suspicious activity.

Further, if there is a correlation between the user's security risk profile and a personalized threat profile of a spreading threat, a personalized proactive alert is issued (OPERATION 214) and/or personalized proactive protective action is taken (OPERATION 218). Illustratively, the personalized proactive alert informs the user of the spreading threat that the user and/or the user's host computer system is particularly susceptible to. Further, the personalized proactive protective action taken provides automated risk mitigation.

In this manner, a user is put on advanced notice of threats that are significant to the user allowing the user to increase the user's vigilance to protect the user from the threats. Also, a user is not awash in a flood of meaningless alerts and so the user is more likely to respond to the personalized proactive alert. Further, automated risk mitigation techniques are performed to further protect the user from the threats.

Figure 1:
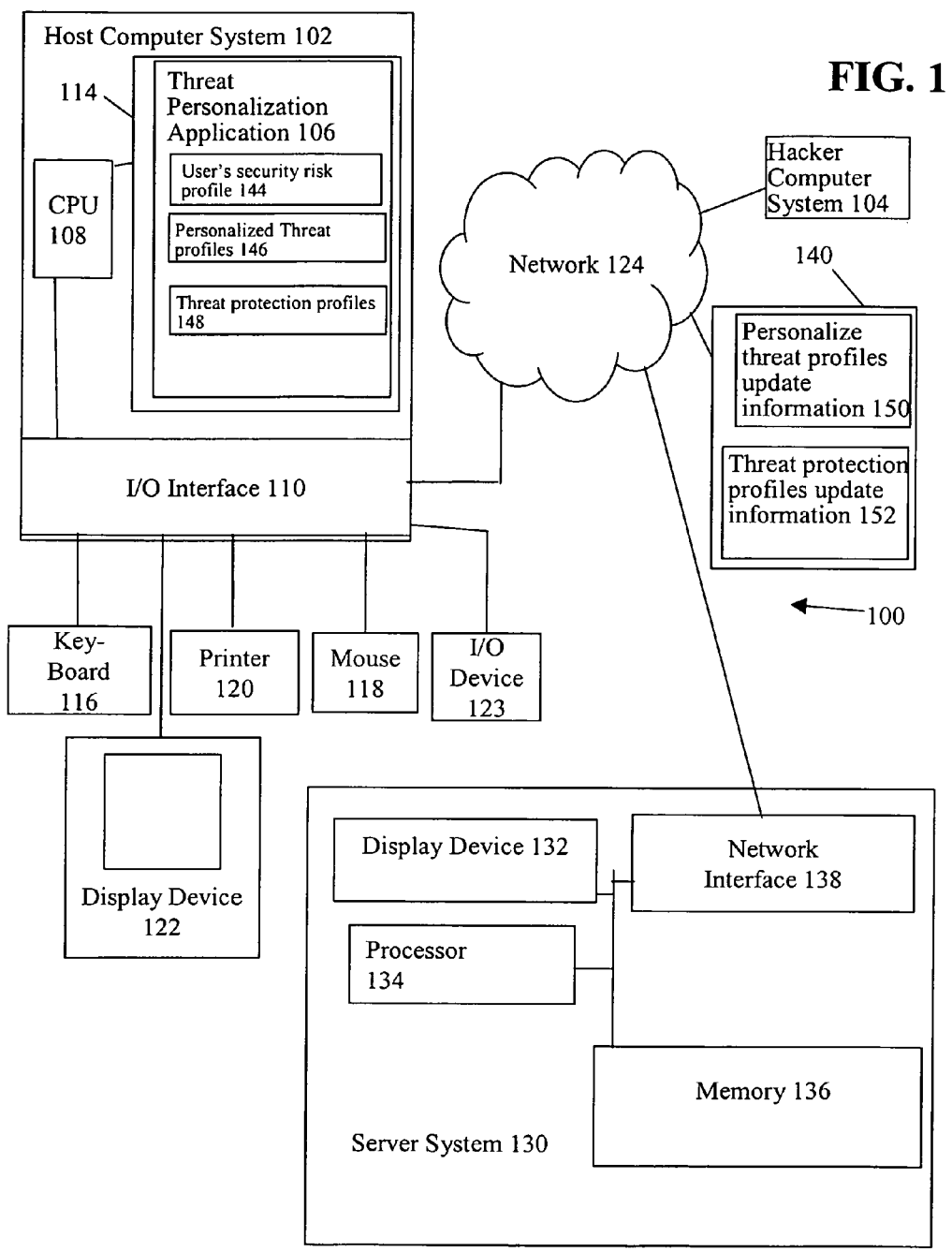
FIG. 1 is a diagram of a client-server system that includes a threat personalization application executing on a host computer system in accordance with one embodiment of the present invention.

More particularly, FIG. 1 is a diagram of a client-server system 100 that includes a threat personalization application 106 executing on a host computer system 102 in accordance with one embodiment of the present invention.

Host computer system 102, sometimes called a client or user device, typically includes a central processing unit (CPU) 108, sometimes called a processor 108, an input/output (I/O) interface 110, and a memory 114. Host computer system 102 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from host computer system 102.

In one embodiment, threat personalization application 106 is loaded into host computer system 102 via I/O device 123, such as from a CD, DVD, or floppy disk containing threat personalization application 106.

Host computer system 102 is coupled to a server system 130 of computer system 100 by a network 124. Server system 130 typically includes a display device 132, a processor 134, a memory 136, and a network interface 138. Additional computer systems such as a hacker, e.g., a second, computer system 104 and an update information server 140 are also associated with network 124.

Network 124 can be any network or network system that is of interest to a user. In various embodiments, network interface 138 and I/O interface 110 include analog modems, digital modems, or a network interface card.

Threat personalization application 106 is stored, for example, in memory 114 of host computer system 102 and executed on host computer system 102.

The particular type of and configuration of host computer system 102, server system 130, hacker computer system 104, and update information server 140 are not essential to this embodiment of the present invention.

Herein, in one embodiment, malicious code is defined as any computer program, module, set of modules, or code that enters a computer system environment without an authorized user's knowledge and/or without an authorized user's consent. A computer virus is one example of a malicious code. For example, the malicious code is propagated from hacker computer system 104 to host computer system 102.

FIG. 2 is a flow diagram of a threat personalization process 200 for issuing personalized proactive and reactive alerts in accordance with one embodiment of the present invention. Referring now to FIGS. 1 and 2 together, in one embodiment, execution of threat personalization application 106 by processor 108 results in the operations of threat personalization process 200 as described below.

From an ENTER OPERATION 202, flow moves to a CREATE USER'S SECURITY RISK PROFILE OPERATION 204. In CREATE USER'S SECURITY RISK PROFILE OPERATION 204, the user's security risk profile is created. For example, a user's security risk profile 144, e.g., a module of threat personalization application 106 as shown in FIG. 1, is created in CREATE USER'S SECURITY RISK PROFILE OPERATION 204.

In one embodiment, the user's security risk profile is a profile of the user's security risk. The user's security risk is the personalized security risk of the user of the host computer system, e.g., of host computer system 102.

As discussed further below, the user's security risk profile is built from two profiles: (1) the user's behavior profile; and (2) the user's system profile. In one embodiment, the user's behavior profile is the profile of the user's behavior on the host computer system. The user's behavior is the personalized behavior of the user on the host computer system. The user's behavior profile is characterized by, but not limited to, one or more of the following attributes: (1) the user's accounts and memberships; (2) the user's online activities; (3) the user's network behavior; (4) the user's use of external devices; and (5) the user's update behavior.

Accordingly, the user's behavior is personalized to the particular user, e.g., an individual human, of the host computer system. Thus, if more than one user uses the host computer system, each user will have a personalized user's behavior profile and an associated personalized user's security risk profile.

However, in another embodiment, the user's behavior is personalized to the composite, aggregated users, e.g., a group of individual humans, of the host computer system. Thus, if more than one user uses the host computer system, the personalized user's behavior profile and the associated personalized user's security risk profile is for the group of individual humans.

As set forth above, the user's security risk profile is also built from the user's system profile. As set forth further below, the user's system profile is the profile of the user's system, sometimes called the user's system activity, on the host computer system. The user's system is the personalized system of the user on the host computer system. The user's system is characterized by, but not limited to, one or more of the following attributes: (1) the user's sensitive applications, e.g., applications that are likely to possess or protect confidential user data; (2) the user's high-risk applications, e.g., applications that indicate that the user may engage in high-risk online behavior; (3) the user's valuable data/files; and (4) the user's system and application rate of change, e.g., install/uninstall frequency, and modifications to configurations.

Accordingly, the user's system profile is also personalized to the particular user, e.g., human, of the host computer system. Thus, if more than one user uses the host computer system, each user will have a personalized user's system profile and an associated personalized user's security risk profile.

However, in another embodiment, the user's system profile is personalized to the composite, aggregated users, e.g., a group of individual humans, of the host computer system. Thus, if more than one user uses the host computer system, the personalized user's system profile and the associated personalized user's security risk profile is for the group of individual humans.

To illustrate a user's security risk profile, a user's behavior profile indicates that the user visits the website of an online bank through the Internet, the online bank hypothetically named BigBank for purposes of discussion and that the user has an account at BigBank. Specifically, the user's behavior profile indicates that the user is a BigBank customer and visited BigBank's URL three days ago. Further, the user's behavior profile indicates that the user executes e-mail attachments they receive via e-mail with some frequency. Further, the user's system profile indicates that the user has a password manager application that has the account and password information for online banking at BigBank. As the password manager application includes confidential information, the password manager application is a sensitive application.

Accordingly, the personalized user's security risk profile indicates that the user uses online banking through the Website of BigBank, has recently visited BigBank's URL, and also uses a password manager application to gain access to the user's account at BigBank.

Although a user is described herein as being an individual human, in one embodiment, a user is an organization or enterprise. In accordance with this embodiment, the user's security risk profile is the personalized security risk profile of the organization or enterprise. Thus, although a user is described herein as an individual human for purposes of simplicity, it is to be understood that a user can also be an organization or enterprise.

From CREATE USER'S SECURITY RISK PROFILE OPERATION 204, flow moves to a CREATE PERSONALIZED THREAT PROFILES OPERATION 206. In CREATE PERSONALIZED THREAT PROFILES OPERATION 206, personalized threat profiles are created. The personalized threat profiles are the collection of individual personalized threat profiles. For example, personalized threat profiles 146 as a module of threat personalization application 106 as shown in FIG. 1 are created in CREATE PERSONALIZED THREAT PROFILES OPERATION 206.

As set forth further below, an individual personalized threat profile, sometimes called a personalized security risk profile, is the personalized profile of an individual threat. The personalized profile includes metadata content that details the threat's specific attributes. These attributes include, but are not limited to, one or more of the following attributes: (1) propagation vectors of the threat; (2) targeted accounts of the threat; (3) targeted locations/applications of the threat; (4) targeted data of the threat; (5) geographic vicinity of the threat; (6) exploited vulnerabilities of the threat; (7) update/install activity of the threat; and (8) denial of service capabilities and targets of the threat.

In one embodiment, an individual personalized threat profile indicates what the threat does on an infected system, what data the threat targets, and what types of activities put a user at a high-risk from the threat.

The individual personalized threat profile is in addition to the threat protection profile of the threat. In one embodiment, the threat protection profile includes, but is not limited to, the definition/signatures which detect/block/remove the threat from the host computer system.

As is well known to those of skill in the art, a threat, i.e., malicious code such as malware/spyware, is collected as a sample, e.g., at a security center. The sample is analyzed, e.g., automatically and/or manually, to fingerprint the threat. Once the threat is fingerprinted, threat definitions, sometimes called threat signatures, are created for the threat. These threat definitions, i.e., forming at least part of the threat protection profile, are updated periodically on a host computer system, for example, using Symantec's LIVEUPDATE feature or other updating mechanism.

A security, e.g., antivirus, application scans the host computer system using the threat protection profile to locate the threat on the host computer system. Once the threat is located, the antivirus application takes protective action to protect the host computer system from the threat, e.g., removes or disables the threat. Illustratively, threat protection profiles 148, e.g., a module of threat personalization application 106, of host computer system 102 include a plurality of individual threat protection profiles of threats.

In accordance with one embodiment, in addition to fingerprinting the threat to create the threat protection profile as set forth above, the threat is further analyzed automatically or manually to retrieve additional information from the threat to create the personalized threat profile of the threat. The personalized threat profile of the threat is delivered to the host computer system along with the threat protection profile of the threat, for example, using Symantec's LIVEUPDATE feature or other updating mechanism or during installation of threat personalization application 106.

Illustratively, paying particular attention to FIG. 1, update information server 140 includes both personalized threat profiles update information 150 and threat protection profiles update information 152. Personalized threat profiles update information 150 includes updated personalized threat profiles, e.g., for the threats. In contrast, threat protection profiles update information 152 includes updated threat protection profiles such as new threat signatures for detecting/blocking/removing new threats.

Accordingly, in one embodiment, in CREATE PERSONALIZED THREAT PROFILES OPERATION 206, personalized threat profiles, e.g., created at a security center, are retrieved by threat personalization application 106. Illustratively, the personalized threat profiles are retrieved by downloading personalized threat profiles update information 150 from update information server 140. In one embodiment, threat protection profiles update information 152 is also retrieve although this is not essential to this embodiment of the present invention.

In another embodiment, CREATE PERSONALIZED THREAT PROFILES OPERATION 206 includes the creation of the personalized threat profiles, e.g., at the security center. The personalized threat profiles are published for public access in one embodiment, e.g., as new website content or publicly available security reports such as the Internet Security Threat Report (ISTR) published by SYMANTEC corporation.

To illustrate a personalized threat profile of a threat, hereinafter referred to as the BigBank threat, the personalized threat profile indicates that the BigBank threat targets accounts at online banks including BigBank. Further, the BigBank threat invades password manager applications to retrieve, sometimes called steal, user account and password information. Still further, the BigBank threat propagates as an e-mail attachment.

Illustratively, the BigBank threat steals user account and password information and forwards the information to hacker computer system 104. The user of hacker computer system 104, sometimes referred to as a cybercriminal, uses the user account and password information for pecuniary gain.

Although CREATE USER'S SECURITY RISK PROFILE OPERATION 204 is discussed above and illustrated as being performed prior to CREATE PERSONALIZED THREAT PROFILES OPERATION 206, in other embodiments, CREATE PERSONALIZED THREAT PROFILES OPERATION 206 is performed prior to or simultaneously with CREATE USER'S SECURITY RISK PROFILE OPERATION 204. Illustratively, CREATE PERSONALIZED THREAT PROFILES OPERATION 206 is continuously being performed at a security center as new threats are discovered and CREATE USER'S SECURITY RISK PROFILE OPERATION 204 is being performed on the host computer system periodically or as the user's security risk profile changes.

From CREATE PERSONALIZED THREAT PROFILES OPERATION 206, flow moves to a CORRELATION BETWEEN USER'S SECURITY RISK PROFILE AND PERSONALIZED THREAT PROFILE OF ACTUAL THREAT CHECK OPERATION 208. In CORRELATION BETWEEN USER'S SECURITY RISK PROFILE AND PERSONALIZED THREAT PROFILE OF ACTUAL THREAT CHECK OPERATION 208, a determination is made as to whether there is a correlation between the user's security risk profile and a personalized threat profile of an actual threat.

For example, an antivirus application, e.g., a module of threat personalization application 106, scans host computer system 102 using the threat protection profile, e.g., the threat's signature, to locate the threat on host computer system 102. Once the threat is located, the antivirus application takes protective action to protect the host computer system from the threat, e.g., removes or disables the threat.

Further, the personalized threat profile of the threat is correlated with the user's security risk profile in CORRELATION BETWEEN USER'S SECURITY RISK PROFILE AND PERSONALIZED THREAT PROFILE OF ACTUAL THREAT CHECK OPERATION 208.

Illustratively, the correlation is triggered after successful detection of the threat during an on-demand or on-access scan by the antivirus application as set forth above.

Correlation of the personalized threat profile of the threat with the user's security risk profile is performed using any one of a number of techniques and the particular technique used is not essential to this embodiment of the present invention.

If a determination is made that there is a correlation between the user's security risk profile and a personalized threat profile of an actual threat, flow moves from CORRELATION BETWEEN USER'S SECURITY RISK PROFILE AND PERSONALIZED THREAT PROFILE OF ACTUAL THREAT CHECK OPERATION 208 to an ISSUE PERSONALIZED REACTIVE ALERT OPERATION 210. In ISSUE PERSONALIZED REACTIVE ALERT OPERATION 210, a personalized reactive alert is issued.

In one embodiment, a personalized reactive alert is an alert personalized to the user of the host computer system. For example, the personalized reactive alert informs the user of the specific behavior of the user that has created a very high risk for the user in light of the actual threat detected on the host computer system.

In one embodiment, a personalized reactive alert informs the user of specific non-computer related, e.g., business oriented, action that the user should take in light of the detection of the actual threat on the host computer system. The personalized reactive alert is non-technical such that a user having limited computer experience will understand the personalized reactive alert and the importance of taking the action specified by the personalized reactive alert in one embodiment. For example, the personalized reactive alert informs the user of the specific suspected data that may have been compromised by the threat and how likely it is that the data has been compromised.

To illustrate, assume that the actual threat detected is the BigBank threat. Further, assume that the user's security risk profile indicates that the user has recently performed online banking at BigBank and uses a password manager application to access the online banking features of BigBank. Recall that the BigBank threat targets accounts at online banks including BigBank and steals user account and password information.

Accordingly, a determination is made in CORRELATION BETWEEN USER'S SECURITY RISK PROFILE AND PERSONALIZED THREAT PROFILE OF ACTUAL THREAT CHECK OPERATION 208, that there is a correlation between the actual threat detected, i.e., the BigBank threat, and the user's security risk profile. Thus, the personalized reactive alert is issued in ISSUE PERSONALIZED REACTIVE ALERT OPERATION 210.

In accordance with one embodiment, the personalized reactive alert informs the user that the BigBank threat has been detected on the host computer system. Further, the personalized reactive alert informs the user that the BigBank threat targets accounts at BigBank, and that the user has recently performed online banking at BigBank. Still further, the personalized reactive alert informs the user that the user's online bank account and password information at BigBank may have been compromised by the BigBank threat, and that the user should contact BigBank to determine whether any fraudulent transactions have occurred, to change the user's account and password information, and to alert BigBank to monitor the user's account for any suspicious activity.

In one specific example, the following message is displayed to the user: "The BigBank threat has infected your machine. Your account details for BigBank may have been stolen since you visited the bank website 3 days ago."

In one embodiment, in addition to informing the user of the specific non-computer related action that the user should take, the user is also informed of the specific computer related, e.g., technical, action the user should take in light of the detection of the actual threat on the host computer system in ISSUE PERSONALIZED REACTIVE ALERT OPERATION 210. For example, the user is informed of the specific action the user should take to remove the BigBank threat from the host computer system.

The personalized reactive alert is issued to the user in one embodiment. For example, the personalized reactive alert is issued as a personal attack detection alert to a user of the host computer system. In another example, the personalized reactive alert is issued as a critical threat detection alert to an enterprise.

Further, the personalized reactive alert is issued to an organization of which the user is a customer in another embodiment. To continue with the example above, the personalized reactive alert is issued to BigBank informing BigBank that BigBank's customers are under attack.

From ISSUE PERSONALIZED REACTIVE ALERT OPERATION 210, flow moves to and exits at an EXIT OPERATION 216.

Referring again to CORRELATION BETWEEN USER'S SECURITY RISK PROFILE AND PERSONALIZED THREAT PROFILE OF ACTUAL THREAT CHECK OPERATION 208, if a determination is made that there is no correlation between the user's security risk profile and a personalized threat profile of an actual threat, flow moves to a CORRELATION BETWEEN USER'S SECURITY RISK PROFILE AND PERSONALIZED THREAT PROFILE OF SPREADING THREAT CHECK OPERATION 212. Illustratively, an actual threat is not detected on the host computer system and accordingly a determination is made that there is no correlation between the user's security risk profile and a personalized threat profile of an actual threat. Alternatively, an actual threat is detected on the host computer system, however, there is no correlation between the personalized threat profile of the actual threat and the user's security risk profile.

In yet another embodiment, CORRELATION BETWEEN USER'S SECURITY RISK PROFILE AND PERSONALIZED THREAT PROFILE OF ACTUAL THREAT CHECK OPERATION 208 is not performed and flow moves direct from CREATE PERSONALIZED THREAT PROFILES OPERATION 206 to CORRELATION BETWEEN USER'S SECURITY RISK PROFILE AND PERSONALIZED THREAT PROFILE OF SPREADING THREAT CHECK OPERATION 212.

In CORRELATION BETWEEN USER'S SECURITY RISK PROFILE AND PERSONALIZED THREAT PROFILE OF SPREADING THREAT CHECK OPERATION 212, a determination is made as to whether there is a correlation between the user's security risk profile and a personalized threat profile of a spreading threat.

In one example, the correlation is performed periodically. In another example, correlation is triggered by a substantial change in the user's security risk profile including the user's behavior profile and/or the user's system profile. These changes are assigned points to determine the relative magnitude of change for an action or series of actions. If a threshold is reached or exceeded, correlation is triggered.

If a determination is made that there is no correlation between the user's security risk profile and a personalized threat profile of a spreading threat, flow moves to and exits at EXIT OPERATION 216. Conversely, if a determination is made that there is a correlation between the user's security risk profile and a personalized threat profile of a spreading threat, flow moves to an ISSUE PERSONALIZED PROACTIVE ALERT OPERATION 214.

In ISSUE PERSONALIZED PROACTIVE ALERT OPERATION 214, a personalized proactive alert is issued. In one embodiment, a personalized proactive alert informs the user of a spreading threat that the user and/or the user's host computer system is particularly susceptible to.

The personalized proactive alert is issued to the user in one embodiment. For example, the personalized proactive alert is issued as a personal outbreak alert to a user of the host computer system. Further, in other examples, the personalized proactive alert is issued as a personalized (custom) threat dashboard, a personalized (custom) outbreak alert, a DEEPSIGHT alert and/or as a technical support intelligence alert to an enterprise.

In this manner, a user is put on advanced notice of spreading threats that are significant to the user allowing the user to increase the user's vigilance to protect the user from the threats. Also, a user is not awash in a flood of meaningless alerts and so the user is more likely to respond to the personalized proactive alert.

Further, in one embodiment, the personalized proactive alert informs the user of specific action that the user should take to minimize the susceptibility to the spreading threat, i.e., proactive action. For example, the personalized proactive alert informs the user that the user should update the threat protection profiles on the host computer system, e.g., update virus definitions. Further, the personalized proactive alert informs the user that the user should have the latest security application(s), e.g., antivirus application, to provide the maximum protection for the host computer system.

Further, the personalized proactive alert informs the user of risky behavior to be avoided to prevent infection by the spreading threat. For example, the user is warned to avoid execution of attachments in e-mails from unknown senders to prevent infection by a threat spreading as an attachment to e-mail. In another example, the user is warned to avoid using file-sharing software to prevent infection by a new peer-to-peer (P2P) propagating worm.

In one embodiment, a personalized threat score, e.g., a ranking personalized to the user of the risk of the threat, is provided to the user in ISSUE PERSONALIZED PROACTIVE ALERT OPERATION 214.

In the above manner, threats are matched to a user providing the user specific, relevant information as to the possible impact of a threat to the user and the proactive protective action that the user can take, sometimes called remediation guidance, to minimize or avoid the impact.

To illustrate, assume the BigBank threat is a new threat that is rapidly spreading. However, the user's host computer system has not been infected with the BigBank threat. In CORRELATION BETWEEN USER'S SECURITY RISK PROFILE AND PERSONALIZED THREAT PROFILE OF SPREADING THREAT CHECK OPERATION 212, a determination is made that there is a correlation between the user's security risk profile and the personalized threat profile of the BigBank threat. Accordingly, flow moves to ISSUE PERSONALIZED PROACTIVE ALERT OPERATION 214 and a personalized proactive alert is issued.

For example, in one embodiment, the user is informed that the BigBank threat is a rapidly spreading threat and that the user and/or the user's host computer system are particularly susceptible to the BigBank threat. In one embodiment, the reasons why the user and/or the user's host computer system are particularly susceptible to the BigBank threat are set forth. Illustratively, the user is informed that the user banks online at BigBank and that the BigBank threat targets such online banking. Further, the user is informed that the BigBank threat steals online bank account and password information.

Further, the user is informed of the specific action that the user should take to minimize the susceptibility to the spreading threat, i.e., proactive action. For example, the user is informed that the threat protection profiles on the host computer system are outdated and thus that the user should renew/update the threat protection profiles on the host computer system. Further, the user is informed that the BigBank threat spreads as an attachment to e-mail and that the user should avoid execution of attachments in e-mails from unknown sender.

As a specific example, the user is provided the following message "There has been a large increase in infections of the BigBank Threat. This threat matches your profile as a BigBank customer and online banking user. Known infection websites will be automatically blocked, exercise additional caution when opening e-mail, especially those from unknown senders."

Further, the personalized proactive alert is issued to an organization of which the user is a customer in another embodiment. To continue with the example above, the personalized proactive alert is issued to BigBank informing BigBank that there is a high risk of attack of BigBank's customers.

From ISSUE PERSONALIZED PROACTIVE ALERT OPERATION 214, flow moves to a TAKE PERSONALIZED PROACTIVE PROTECTIVE ACTION OPERATION 218. In TAKE PERSONALIZED PROACTIVE PROTECTIVE ACTION OPERATION 218, personalized proactive protective action is taken to protect the user and/or the user's host computer system from the spreading threat. For example, certain URLs are blocked or certain system activities are limited. Thus, the personalized proactive protective action taken provides automated risk mitigation protecting the user and/or the user's host computer system from the spreading threat.

From TAKE PERSONALIZED PROACTIVE PROTECTIVE ACTION OPERATION 218, flow moves to and exits at EXIT OPERATION 216. Although both ISSUE PERSONALIZED PROACTIVE ALERT OPERATION 214 and TAKE PERSONALIZED PROACTIVE PROTECTIVE ACTION OPERATION 218 are described above as being performed, in other embodiments, either ISSUE PERSONALIZED PROACTIVE ALERT OPERATION 214 or TAKE PERSONALIZED PROACTIVE PROTECTIVE ACTION OPERATION 218, is performed, but not both.

Thus, as set forth above, a user's security risk profile is correlated with personalized threat profiles of threats. Upon a determination that there is a match, the user is provided with a personalized alert, i.e., either a personalized reactive alert in case of detection of an actual threat or a personalized proactive alert in case of a spreading threat. In either case, the alert provides the user specific, relevant information as to the possible impact of the threat to the user and the action that the user can take, sometimes called remediation guidance, to minimize or avoid the impact. Illustratively, this allows a user to easily discern between a threat which simply tracks browsing behavior and displays ads and a Trojan horse which compromises bank account information, i.e., the significance of a threat to the specific user.

Figure 3:
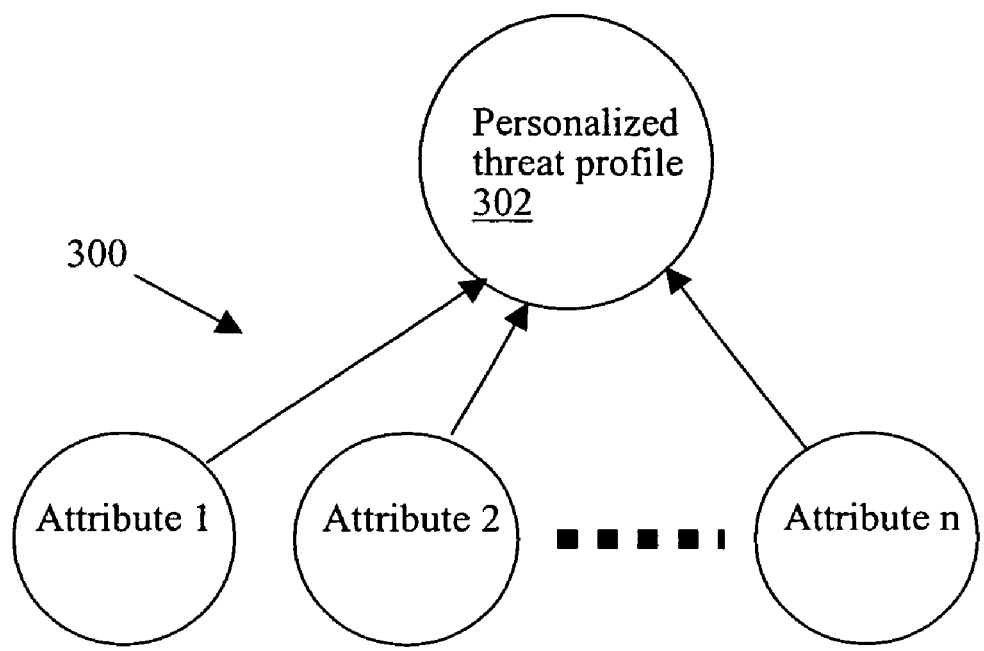
FIG. 3 is a diagram of a personalized threat profile hierarchy in accordance with one embodiment of the present invention.
Figure 4:
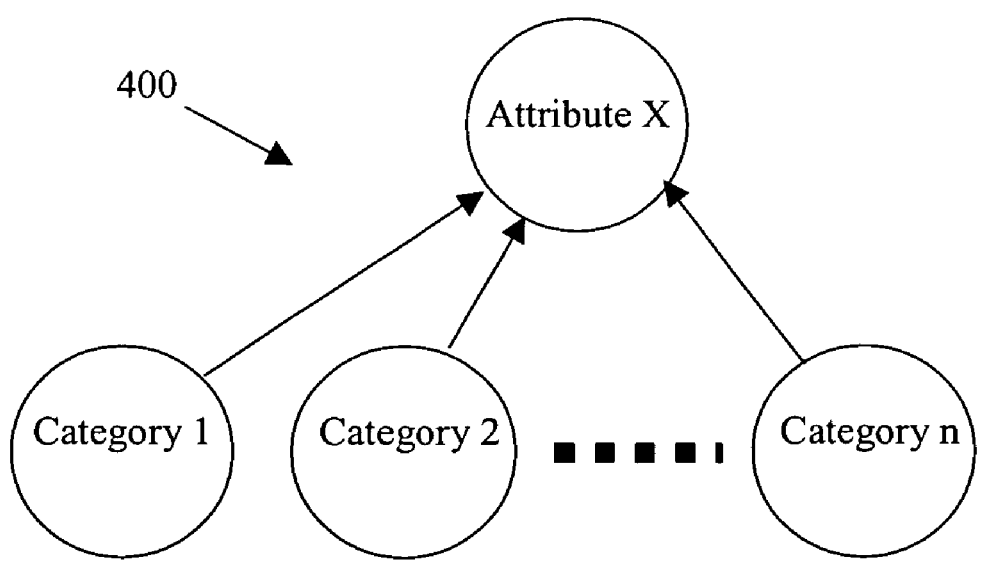
FIG. 4 is a diagram of an attribute hierarchy in accordance with one embodiment of the present invention.

FIG. 3 is a diagram of a personalized threat profile hierarchy 300 in accordance with one embodiment of the present invention. FIG. 4 is a diagram of an attribute hierarchy 400 in accordance with one embodiment of the present invention. Generally, a personalized threat profile is defined by, sometimes called built by or includes, one or more attributes. Each attribute, in turn, is defined by, sometimes called built by or includes, one or more categories.

Referring now to FIGS. 3 and 4 together, a personalized threat profile 302 is defined by one or more attributes 1, 2, . . . n. Each attribute 1, 2, . . . n, illustrated generally as attribute x in FIG. 4, in turn, is defined by one or more categories 1, 2, . . . n. The other attributes are defined by categories in a similar manner.

THREAT PROFILE—illustratively attributes and associated categories are set forth below for a personalized threat profile.

Propagation Vectors Attribute—This attribute describes how the threat propagates, i.e., the vectors used by the threat to spread. Categories associated with this attribute possess values which may be used for blocking or alerting detail, for example, "Web" may list hostile URLs which are known to install a threat. Categories associated with this attribute are used to match to user Internet usage behavior categories and other user attributes.

Categories associated with this attribute include, but are not limited to: E-mail; Web; P2P; Instant Messaging; Network Share; RSS; MMS; BlueTooth; and USB Device.

Targeted Accounts Attribute—This attribute describes the accounts the threat targets. Categories associated with this attribute are used to match the threat to the user's online memberships and activities to determine the likelihood of the account being stolen and used in an unauthorized fashion.

Categories associated with this attribute include, but are not limited to: Online Bank; Online Payment Service; Online Gaming; Online Auction; and Online Community.

Targeted Locations/Applications attribute—This attribute describes the locations, e.g., website, and applications that the threat targets. Categories associated with this attribute are used to match the user's website activity preferences as well as installed applications to determine the potential effectiveness of keystroke logging behavior or other monitoring/date theft activities. In one embodiment, a category is as specific as targeting emails written to certain addresses.

Categories associated with this attribute include, but are not limited to: Websites; and Applications.

Targeted Data attribute—This attribute describes the data that the threat targets. Categories associated with this attribute are used to match the threat to the data it targets for theft, modification or deletion. In one embodiment, the data includes a password file, a Quicken data file, a CAD design file, a graphic file in the My Documents folder.

Categories associated with this attribute include, but are not limited to: Personal Finance; Password Files/Managers; Online Gaming; and File Types.

Geographic Vicinity Attribute—This attribute describes the geographic vicinity in which the threat is active. Categories associated with this attribute indicates areas where there has been known threat activity, either using firewall and intrusion detection or intrusions prevention alert data (e.g., DeepSight), Antispam data (e.g., Brightmail), submission data (e.g., antivirus submission data from customers and partners), or other information gleaned from an internet security data collection network or system (e.g., the Global Intelligence Network) or other security system.

Categories associated with this attribute include, but are not limited to: IP Address Blocks or ranges; Country; State; and City.

Exploited Vulnerabilities Attribute—This attribute describes the vulnerabilities that the threat exploits, i.e., in an attempt to gain unauthorized access or disrupt normal behavior. Categories associated with this attribute indicate vulnerabilities exploited by the threat itself or those that are known to be used in an attempt to install it. This category can also be used to suggest mitigation action to the user or organization via indicating the availability of a patch or work-around.

Categories associated with this attribute include, but are not limited to: Used to Install Threat; Exploited By Threat; Patch Availability; Patch Location; Work-Arounds.

Update/Install Activity Attribute—This attribute describes the update/install behavior of the threat. Categories associated with this attribute Indicate if the threat "phones home" to access updated instructions or to download additional malware or software functionality updates. Categories associated with this attribute are used for blocking and mitigation as well as potentially chaining to other threat events.

Categories associated with this attribute include, but are not limited to: URL; FTP; TFTP; P2P; VOIP; IM; and IRC.

Denial of Service Attribute—This attribute describes the denial of service attack associated with the threat. Categories associated with this attribute indicate the denial of service type (e.g., SYN Flood, UDP Flood) as well as any hard-coded timeframe or targets of the attack(s).

Categories associated with this attribute include, but are not limited to: Type; Time/Date; and Targets.

Figure 5:
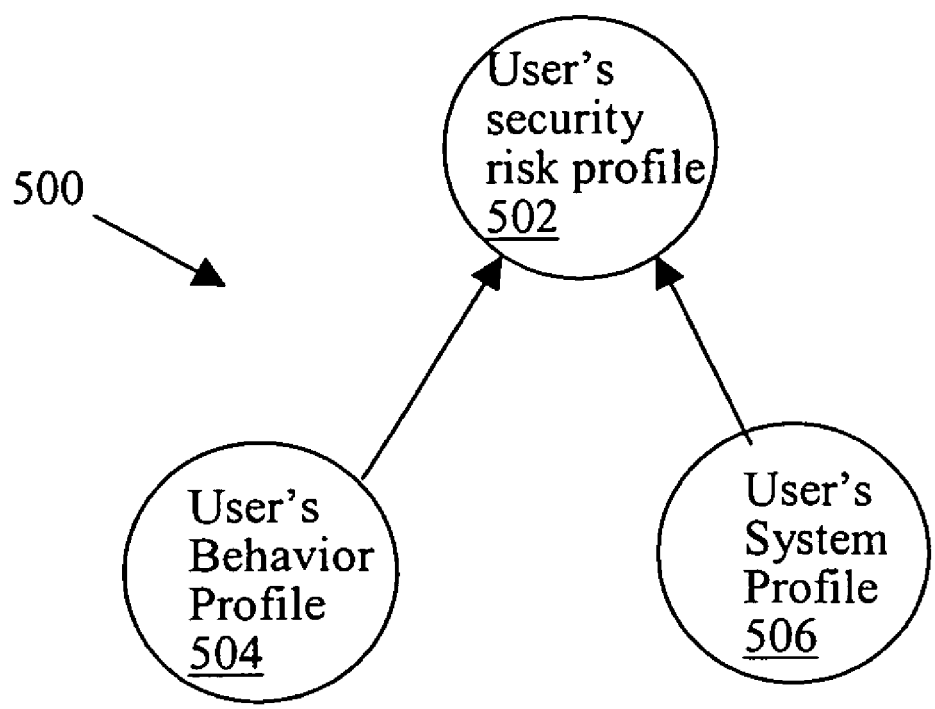
FIG. 5 is a diagram of a user's security risk profile hierarchy in accordance with one embodiment of the present invention.

FIG. 5 is a diagram of a user's security risk profile hierarchy 500 in accordance with one embodiment of the present invention. Referring to FIG. 5, a user's security risk profile 502 is defined by, sometimes called built by or includes, a user's behavior profile 504 and a user's system profile 506. In a manner similar to a threat profile (see FIG. 3), each of user's behavior profile 504 and user's system profile 506 is defined by, sometimes called built by or includes, one or more attributes. In a manner similar to an attribute of a threat profile (see FIG. 4), each attribute, in turn, is defined by, sometimes called built by or includes, one or more categories.

USER'S BEHAVIOR PROFILE—set forth below are illustratively attributes and associated categories for the user's behavior profile.

Accounts/Memberships attribute—This attribute describes the accounts/memberships of the user. Categories associated with this attribute indicate the user's online accounts to things such as online banks, payment services, and online auctions. Categories associated with this attribute also indicate the user's memberships to online communities such as MySpace, and LinkedIn or online gaming communities such as World of Warcraft and Everquest.

Specific categories associated with this attribute include, but are not limited to: Online Bank; Online Payment Service; Online Gaming; Online Auction; and Online Community.

Online/Internet Activities attribute—This attribute describes the online/Internet activities of the user.

Categories associated with this attribute indicate the activities that a user undertakes online, the frequency, and the applications the user uses for such activities, the places the user frequently visits (web), whether or not the user frequently sends and receives attachments (email), and whether or not the user sends and receives files (IM). These categories are split into a series of separate attributes in another embodiment.

Categories associated with this attribute include, but are not limited to: Web; E-mail; Instant Messaging; File-Sharing; RSS; and VOIP.

Networking Behavior attribute—This attribute describes the networking behavior of the user. Categories associated with this attribute indicate the number and type of networks a user connects to. More particularly, categories associated with this attribute specifically call out whether or not a user connects to 1-2 networks on a regular basis or is "promiscuous", connecting to a large number of new networks and signaling higher risk. Categories associated with this attribute also call out whether or not the user connects to wired or wireless networks, how frequently, how varied the networks are, and the type of security measures used on such networks, i.e. are they secured via common wireless security protocols such as WPA or insecure.

Categories associated with this attribute include, but are not limited to: Network Connections; and Wireless.

Use of External Devices attribute—This attribute describes the user's use of external devices. Categories associated with this attribute indicate the type of third party devices a user connects to their computer to determine if the user might be at risk from a threat crossing over from such a device onto their system.

Categories associated with this attribute include, but are not limited to: General USB; General BlueTooth; PDA; Audio Device (e.g., MP3 Player); Smart Phone; and Personal Gaming System.

Update Behavior attribute—This attribute describes the update behavior of the user. Categories associated with this attribute indicate how often the user updates their system/applications with the latest patches as well as how frequently the user downloads the latest protection for their security products. Categories associated with this attribute indicate whether or not the user automatically updates and whether or not the user downloads new patches when they become available. Categories associated with this attribute ultimately correlate back to threats which leverage breaking vulnerabilities and exploits such as new worms, threats installed via hostile websites, modular bots.

Categories associated with this attribute include, but are not limited to: Security Update; System Update; and Application Update.

USER'S SYSTEM PROFILE—illustratively attributes and associated categories are set forth below for the user's system profile.

Sensitive Applications Attribute—This attribute describes sensitive applications on the user's computer system. Categories associated with this attribute identify the presence of sensitive applications on the user's computer system. Sensitive applications are those that are likely to possess or protect confidential data such as user accounts, financial details, design files (e.g., CAD) and so forth.

Categories associated with this attribute include, but are not limited to: Personal Finance applications; Password Manager applications; Professional Finance/Accounting applications; Professional Databases; and Design Programs.

High Risk Applications Attribute—This attribute describes high risk applications on the user's computer system. Categories associated with this attribute indicate the presence of applications on a user's system that signal the user might be engaged in high risk online behavior. A high risk application is an application that is used in high risk online behavior.

Categories associated with this attribute include, but are not limited to: Cracks; Hack Tools; Adware; Rogue AntiSpyware; and Peer-to-peer (P2P) applications.

Valuable Data/Files Attribute—This attribute describes valuable data/files on the user's computer system. Categories associated with this attribute are used to match to threats' targeted data attribute to determine potential match for personalized proactive alerts as well as impact calculations for personalized reactive alerts for realized infections/successful attacks. Categories associated with this attribute are split into those that are already known (e.g., CAD design files, Quicken and MS Money data files) and those that are determined to be potentially important based on user system usage. Files that fall in this latter category are those that are used on a frequent basis (e.g., emailed, shared, sent via email, synchronized with external devices such as PDAs). Categories associated with this attribute are built effectively by maintaining a record of file usage as well as the usage of file derivatives (e.g., files based on the original file).

Categories associated with this attribute include, but are not limited to: Known Sensitive File Types; Frequently Accessed Files; Frequently Emailed Files; Frequently Shared Files, e.g., P2P files; and Frequently Synchronized Files (e.g., with PDA, Smart Phone).

System & Application Modification Frequency Attribute—This attribute describes frequency with which the system and applications are modified. Categories associated with this attribute are used to determine the likelihood that the user will install a new application or make a substantial change to the system. Categories associated with this attribute are used to determine the likelihood that the user will inadvertently install adware/dialers/etc. along with another software bundle or make a change to the system's security posture (e.g., reconfigure or turn off the firewall) which would make the user's computer system more susceptible to a threat.

Categories associated with this attribute include, but are not limited to: Install Behavior; Uninstall Behavior; and System Configuration Change.

Below is an example of determining whether there is a correlation between the user's security risk profile and a personalized threat profile in CORRELATION BETWEEN USER'S SECURITY RISK PROFILE AND PERSONALIZED THREAT PROFILE OF SPREADING THREAT CHECK OPERATION 212 (FIG. 2).

Online/Internet Activities Attribute for User's security risk profile

InternetActivities.Frequency.Web:MediumUsage

InternetActivities.Frequency.Email:MediumUsage

InternetActivities.Frequency.InstantMessage:NoUsage

InternetActivities.Frequency.FileSharing:NoUsage
InternetActivities.Frequency.VOIP:NoUsage Propagation Vectors Attribute for Personalized Threat Profile for Threat "Trojan.Bancos.ABC"

Email.Enticement

Email.Attachment

Web.VulnerabilityExploit

FileSharing.DisguisedFile

Correlation Results for Online/Internet Activities Attribute and Propagation Vectors Attribute 75% Match for PropagationVectors Email. Enticement Email.Attachment Web.VulnerabilityExploit Accounts/Memberships Attribute for User's Security Risk Profile Accounts.OnlineBanks:CaixaBank Accounts.OnlinePaymentServices:PayPal Accounts.Communities:MySpace Targeted Accounts Attribute for Personalized Threat Profile for Threat "Trojan.Bancos.ABC"

TargetedAccounts.OnlineBanks:

CaixaBank

BancoNoroeste

FaviolaBank

BanqueBundam

TargetedAccounts.OnlinePayment:

Services eGold

Correlation Results for Accounts/Memberships Attribute and Targeted Accounts Attribute 100% Match for TargetedAcounts.OnlineBank:

CaixaBank

Online/Internet Activities Attribute for User's Security Risk Profile

OnlineActivities.Web.FrequentlyVistedSites:

www.caixabank.com www.ebay.com www.andorra.com

Targeted Locations/Applications Attribute for Personalized Threat Profile for Threat "Trojan.Bancos.ABC"

TargetedLocations.Websites:

www.caixabank.com www.banconoroeste.com www.faviolabank.com www.banquebundam.com www.egold.com Correlation Results for Online/Internet Activities Attribute and Propagation Vectors Attribute 100% Match for TargetedLocations.Websites www.caixabank.com In the example above, the correlation continues until the Trojan.Banco.ABC's threat profile is fully compared against the user's security risk profile or until enough of a deterministic match is discovered (threshold reached) that a personalized proactive alert is issued in ISSUE PERSONALIZED PROACTIVE ALERT OPERATION 214.

Referring again to FIG. 1, although threat personalization application 106 is referred to as an application, this is illustrative only. Threat personalization application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network.

As illustrated in FIG. 1, this medium belongs to the computer system itself. However, the medium is also removed from the computer system. For example, threat personalization application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that execute threat personalization application 106 in accordance with at least one of the embodiments as described herein. Similarly, in another embodiment, host computer system 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, threat personalization application 106 in accordance with one embodiment of the present invention can be implemented in a wide variety of computer system configurations. In addition, threat personalization application 106 could be stored as different modules in memories of different devices. For example, threat personalization application 106 could initially be stored in server system 130, and as necessary, a portion of threat personalization application 106 could be transferred to host computer system 102 and executed on host computer system 102. Consequently, part of the threat personalization functionality would be executed on processor 134 of server system 130, and another part would be executed on processor 108 of host computer system 102. In view of this disclosure, those of skill in the art can implement various embodiments of the present invention in a wide variety of physical hardware configurations using an operating system and computer programming language of interest to the user.

In yet another embodiment, threat personalization application 106 is stored in memory 136 of server system 130. Threat personalization application 106 is transferred over network 124 to memory 114 in host computer system 102. In this embodiment, network interface 138 and I/O interface 110 would include analog modems, digital modems, or a network interface card. If modems are used, network 124 includes a communications network, and threat personalization application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-program product comprising a tangible, non-transitory computer readable medium containing computer program code comprising:
   a threat personalization application for creating, on a host computer system of a user, a user's security risk profile for a user, wherein said user is a human user of said host computer system;
   said user's security risk profile is specific to said user; and said user's security risk profile comprises: building said user's security risk profile from a user's behavior profile and a user's system profile, wherein said user's behavior profile is a personalized behavior of said user on said host computer system; and said user's system profile is a profile of a personalized system of said user on said host computer system; said threat personalization application further for creating a personalized threat profile for a threat with respect to information on said host computer system of a user; said threat personalization application further for determining whether there is a correlation between said user's security risk profile and said personalized threat profile; and said threat personalization application further for issuing a personalized alert to said user based on an outcome of said determining whether there is correlation,
   wherein upon said threat being detected, said personalized alert is a personalized reactive alert;
   and upon said threat not being detected, said personalized alert is a personalized proactive alert;
   wherein said user's behavior profile is characterized by at least one attribute selected from the group comprising of: (1) accounts and memberships of said user; (2) online activities of said user; (3) network behavior of said user; (4) use of external devices by said user; and (5) update behavior of said user; wherein said user's system profile is characterized by at least one attribute selected from the group comprising of: 1) sensitive applications; (2) high-risk applications; (3) valuable data/files; and (4) system and application modification frequency.

2. The computer-program product of claim 1 wherein said personalized threat profile of said threat includes metadata content that details at least one attribute of said threat, said at least one attribute being selected from the group consisting of: (1) propagation vectors of said threat; (2) targeted accounts of said threat; (3) targeted locations/applications of said threat; (4) targeted data of said threat; (5) geographic vicinity of said threat; (6) exploited vulnerabilities of said threat; (7) update/install activity of said threat; and (8) denial of service capabilities and targets of said threat.

3. The computer-program product of claim 1 wherein said threat personalization application is further for taking personalized proactive protective action.

4. The computer-program product of claim 1 wherein creating a personalized threat profile for a threat comprises retrieving said personalized threat profile from an update server.

5. The computer-program product of claim 4 wherein said threat personalization application is further for retrieving a threat protection profile for said threat, said threat protection profile for detecting said threat on said host computer system.

6. The computer-program product of claim 5 wherein personalized reactive alert informs said user of data said threat may have compromised.

7. The computer-program product of claim 5 wherein said personalized proactive alert informs said user that said host computer system is particularly susceptible to said threat.

8. The computer-program product of claim 5 wherein said personalized proactive alert informs said user of specific action that should be taken to minimize the susceptibility to said threat.

9. The computer-program product of claim 5 wherein said personalized proactive alert informs said user of risky behavior to be avoided to minimize the susceptibility to said threat.

10. The computer-program product of claim 1 wherein said threat personalization application is further for creating personalized threat profiles for threats comprising said creating a personalized threat profile for a threat.

11. The computer-program product of claim 10 wherein said threat personalization application is further for creating threat protection profiles for said threats.

12. A computer system comprising:
    a memory having stored therein a threat personalization application; and
    a processor coupled to said memory, wherein execution of said threat personalization application generates a method comprising:
        creating, on a host computer system of a user, a user's security risk profile for a user,
            wherein said user is a human user of said host computer system;
            said user's security risk profile is specific to said user; and
            said user's security risk profile comprises:
                building said user's security risk profile from a user's behavior profile and a user's system profile,
                    wherein said user's behavior profile is a personalized behavior of said user on said host computer system of a user; and
                    said user's system profile is a profile of a personalized system of said user on said host computer system;
        creating a personalized threat profile for a threat with respect to information on said host computer system of a user;
        determining whether there is a correlation between said user's security risk profile and said personalized threat profile; and
    issuing a personalized alert to said user based on an outcome of said determining whether there is correlation,
        wherein upon said threat being detected, said personalized alert is a personalized reactive alert; and
        upon said threat not being detected, said personalized alert is a personalized proactive alert;
        wherein said user's behavior profile is characterized by at least one attribute selected from the group comprising of: (1) accounts and memberships of said user; (2) online activities of said user; (3) network behavior of said user; (4) use of external devices by said user; and (5) update behavior of said user;
        wherein said user's system profile is characterized by at least one attribute selected from the group comprising of: 1) sensitive applications; (2) high-risk applications; (3) valuable data/files; and (4) system and application modification frequency.

* * * * *